United States Patent [19]

Singh et al.

[11] 4,031,610

[45] June 28, 1977

[54] METHOD OF ASSEMBLY OF DYNAMOELECTRIC MACHINES

[75] Inventors: Karnel Singh, North Olmsted; Thomas A. Denny, Lorain; Daniel P. Fritz, Elyria; Orville C. Rising, LaGrange, all of Ohio

[73] Assignee: Airborne Mfg. Co., Elyria, Ohio

[22] Filed: Apr. 30, 1974

[21] Appl. No.: 465,687

[52] U.S. Cl. .................................. 29/598; 29/596; 310/42; 310/45; 310/90
[51] Int. Cl.² .................. H02K 15/14; H02K 15/16
[58] Field of Search .............. 29/596, 598; 310/90, 310/42, 43, 45

[56] References Cited

UNITED STATES PATENTS

| | | | |
|---|---|---|---|
| 3,145,313 | 8/1964 | Tupper | 310/90 |
| 3,165,816 | 1/1965 | Thompson et al. | 29/596 |
| 3,538,598 | 11/1970 | Wightman et al. | 29/596 |
| 3,555,651 | 1/1971 | Latussek et al. | 29/596 |
| 3,824,684 | 7/1974 | Wheeler | 29/596 |

Primary Examiner—Carl E. Hall
Attorney, Agent, or Firm—Bosworth, Sessions & McCoy

[57] ABSTRACT

A method of assembling a dynamoelectric machine with the desired concentricity of the stator and rotor by mounting rotor bearings in loose supporting relationship with bearing brackets having a fixed relationship with the stator, and then locating the bearings in their respective brackets to support the rotor concentrically of the stator, and finally fixedly attaching the bearings to their brackets in their concentrically supportive positions.

7 Claims, 13 Drawing Figures

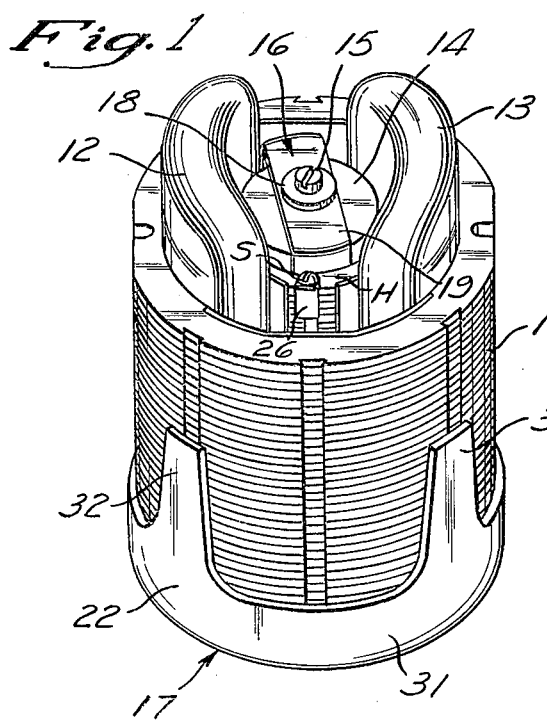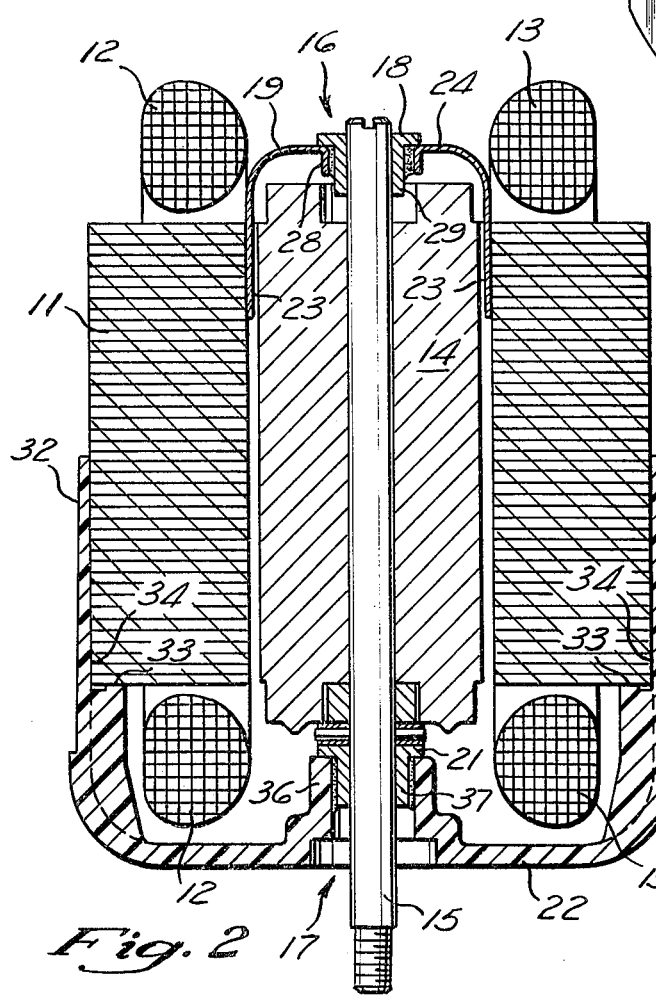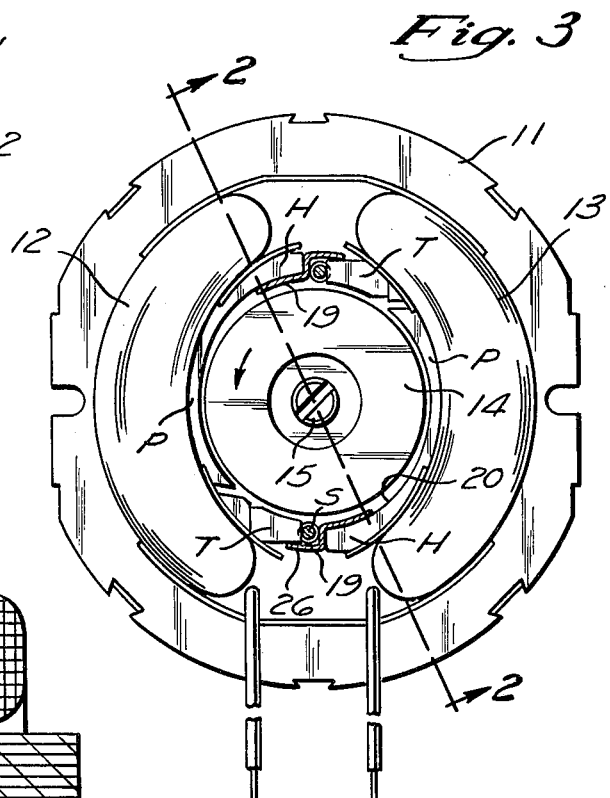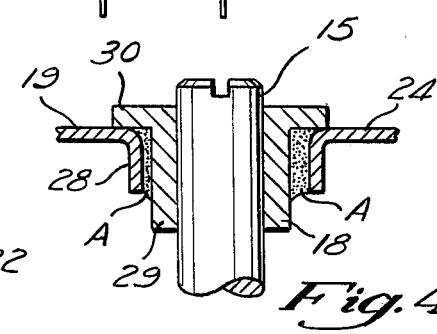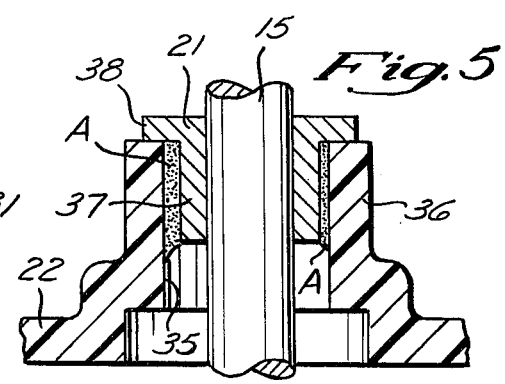

METHOD OF ASSEMBLY OF DYNAMOELECTRIC MACHINES

BACKGROUND OF THE INVENTION

For the effective operation of dynamoelectric machines, it is desirable to assemble the stator and rotor parts so that they have free relative rotational motion with only a small controlled annular air gap between them. For a given cylindrical stator bore and rotor envelope combination, the uniformity of the air gap dimension of the stator and rotor when assembled depends upon their concentricity.

An obvious way of achieving the desired concentricity is by assembling the machine from parts having dimensional tolerances which when combined in the assembly of the machine result in an air gap of acceptable size and uniformity. This method tends to become increasingly expensive and difficult as the acceptable concentricity tolerances are reduced.

Another known method of assembling such machines so their rotor and stator elements have the desired degree of concentricity is disclosed in U. S. Pat. No. 3,165,816. Briefly, in this method of assembling dynamoelectric machines, the rotor and stator elements are axially aligned with an acceptable air gap and measure of concentricity and held in fixed relationship by spacing means such as shims inserted into the annular gap between the elements. The required number of rotor shaft bearings are each mounted in fixed relationship on rotor supporting means.

Each rotor supporting means is then loosely assembled adjacent the stator element, with surfaces of the rotor supporting means being in generally non-supporting and overlapping relation with corresponding surfaces of the stator element, and with the bearing carried by the supporting means fitted on the rotor shaft. Adhesive bonding means is provided in its plastic state between the associated overlapping surfaces of the stator element and the rotor supporting means. The bonding material permits relative movement between the overlapping surfaces as the shaft aligns the bearings with it.

When the bonding means is hardened enough to hold the stator and rotor elements in a fixed relationship, the spacing means are removed from the air gap leaving the rotor and stator elements freely rotatable and generally concentric with respect to each other, and the rotor shaft and bearings freely rotatable and accurately aligned relative to one another.

BRIEF SUMMARY OF THE INVENTION

In contrast to and as an improvement of the foregoing, the method of assembling dynamoelectric machines embodying this invention involves the same elements, but different relationships between them to achieve its unique advantages and results. The method involves a rotor and shaft, a stator, and rotor shaft bearings carried by rotor supporting means or brackets. The rotor supporting brackets, however, have a positive, supporting fit and predetermined relationship with the stator structure. It may be an overlapping type supporting fit between locating surfaces on the rotor supporting means and corresponding surfaces of the stator structure. The latter may be part of the outer surface or the internal bore surface of the stator. The rotor supporting means or bracket may have a positive supporting fit with the stator structure by means of an adaptation of the structure, such as axial holes provided in the stator laminations to receive locating pins on the rotor supporting bracket. In any event, the method disclosed and claimed herein involves rotor supporting bracket means which are adapted to be mounted on and supported by the stator assembly in a predetermined stator relationship and fixed thereto by mechanical or by adhesive bonding means.

In the assembly method of this invention adjustment for concentricity is provided by a loose and otherwise nonlocating fit between each rotor supporting bracket means and the rotor shaft bearing mounted on it. Each rotor supporting bracket preferably is provided with a central opening for receiving a rotor shaft bearing with radially adjustable clearance. When the bearing has been located with respect to its supporting bracket in a relationship providing stator and rotor concentricity the bearing is fixed to the supporting bracket by mechanical or by adhesive bonding means.

The desired relationship between the rotor supporting bracket and the bearing may be established by aid of fixtures having surfaces corresponding to those of the stator and a pin corresponding to the rotor shaft. The pin is located in the fixture to insure that a bearing fitted over and located by it will provide the desired stator and rotor concentricity.

The bearing support bracket and bearing loosely supported in the central opening are placed on the fixture with the bracket's locating surfaces engaging the fixture's corresponding stator surfaces in the desired predetermined stator relationship and with the bearing on the fixture's locating pin. With the bearing thus located with respect to the supporting bracket, they are fastened together in any suitable way. They may be fastened, for example, by bonding adhesive material, by mechanical means, or by tack welding.

Rather than with a fixture, of course, the desired relationship between the rotor supporting bracket and the bearing may be established by using the actual stator and rotor elements themselves axially aligned with the desired air gap and measure of concentricity and maintained in alignment by spacing means such as shims inserted in the annular air gap.

Whether a fixture or the actual stator and rotor elements of a machine are used, the assembly method embodying this invention comprises the steps of positioning the rotor supporting bracket in its predetermined stator relationship with respect to means for relating the bracket's locating surfaces or other locating means and the axis of the stator bore. Next, the rotor shaft bearing is placed in the central opening of the bracket and on the bearing locator means and thus concentric with the location of the stator bore axis. Finally, the bearing is fixed to the bracket in that location.

If a fixture has been used, the assembly of a completed dynamoelectric machine includes the steps of mounting on the stator in the predetermined stator relationship each rotor support bracket and associated bearing fixed to it. The rotor is supported in the stator bore on its shaft by the rotor shaft bearing or bearings.

If the stator and rotor elements themselves have been used to locate the bearings in the rotor support bracket means, assembly of the machine is completed by removing the spacing means from the air gap.

In the method of assembling a dynamoelectric machine comprehended by this invention and described above, novel and advantageous steps comprise, first, positioning the rotor support bracket in the predetermined stator relationship with locating means for relating the location of the axis of the stator bore to it and, second, mounting the rotor shaft bearing on the bracket and the locating means to radially adjust and position the bearing in concentricity with the location of the stator bore axis.

Among the advantages and benefits of the method embodying this invention for assembling a dynamoelectric machine is the establishment of a controlled and uniform air gap without the need for elements and assemblies expensively made to close tolerances.

Also, the entire assembly can be made with mechanical fastening and fixing means, or if adhesive bonding material is used, its use is limited to fastening the rotor bearings to the rotor supporting brackets. Even such use results in a significant saving in expensive bonding material and in labor to apply and cure it.

The method disclosed and claimed herein permits the use of simple fixtures, as explained in greater detail below, for performing the critical steps of locating the shaft bearings in the rotor supporting bracket. This saves the placing and removing of spacing shims in the air gap between the rotor and stator assemblies. Also, when fixtures are used, support bracket and bearing sub-assemblies can be produced separately from the rotor and stator elements, saving oven curing space when bonding adhesives are used to fasten the bearings to their brackets. If assembly is entirely mechanical as comprehended by this invention, no ovens or oven curing time is required and the stator and rotor assemblies need not be subjected to the oven heat.

Also, because of the division of labor possible, assembly through the combination of sub-assemblies is more efficient than the cumulative addition of individual parts and elements to make one assembly, especially when the critical steps such as those providing the desired concentricity can be performed separately as a sub-assembly.

Finally, even when the bearings are located by the shim spaced rotor and stator elements themselves, the assembly method comprehended by this invention permits all adjustment necessary to achieve the desired concentricity to be accomplished by direct physical positioning of the rotor shaft bearings themselves thereby insuring their correct alignment and concentricity.

These and other advantages and benefits of the assembly method of this invention will be apparent from the following detailed description of a preferred and modified forms of the invention.

In addition, it will be apparent from the following description that the inventive method comprehends novel means for practicing the invention.

BRIEF DESCRIPTION OF THE DRAWINGS

FIG. 1 is a perspective view of a representative dynamoelectric machine assembled by methods embodying this invention;

FIG. 2 is an axial section through the machine of FIG. 1, taken in the plane of line 2—2;

FIG. 3 is an end elevation view of the upper end of the machine as seen in FIG. 1, and with the rotor supporting bracket broken away;

FIG. 4 is a partial section in enlarged scale of one end of the rotor shaft and its upper supporting bearing as oriented in FIG. 2;

FIG. 5 is a partial section in enlarged scale of the other end of the rotor shaft and its lower supporting bearing as oriented in FIG. 2;

DETAILED DESCRIPTION OF A PREFERRED EMBODIMENT

Figure 8:
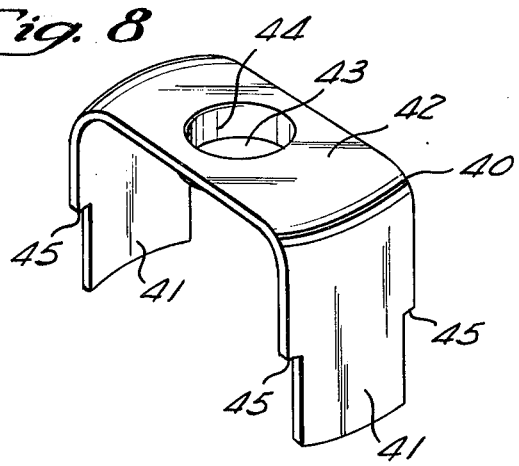
FIG. 8 is a perspective view in enlarged scale of a modified form of rotor supporting bracket.

A dynamoelectric machine representative of those assembled by the method embodying this invention is shown in perspective in FIG. 1. The machine shown is a fractional horsepower, shaded pole motor having a laminated stator structure 11 carrying windings 12 and 13, and a rotor 14 mounted on a shaft 15 and supported by rotor supporting assemblies indicated generally at 16 and 17. Rotor supporting assembly 16 comprises a bearing 18 carried by a bracket 19 having a close supporting fit with bore 20 of stator 11. Rotor supporting assembly 17 comprises a bearing 21 carried by a bracket 22 having a close supporting fit with the outside of stator 11. See FIG. 2.

It will be noted that the two poles P of the machine in FIG. 3 comprise a toe portion T and a heel portion H. The heel portion of each pole is circumferentially adjacent and spaced from the toe portion of the other pole. Further, the bore defined by the poles P has a greater diameter in the region of the heel portion H than in the region of toe portions T.

Figure 6:
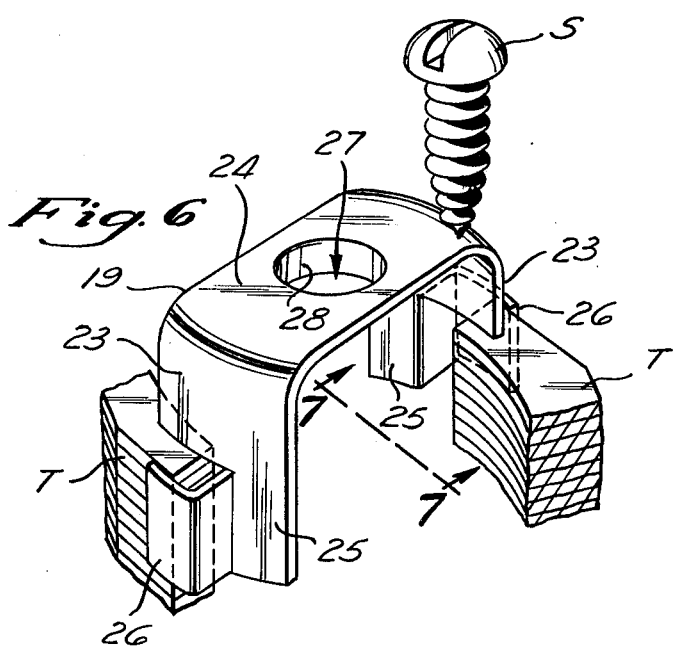
FIG. 6 is a partially exploded perspective view of an upper rotor supporting bracket adapted to be mechanically fastened to the stator.
Figure 7:
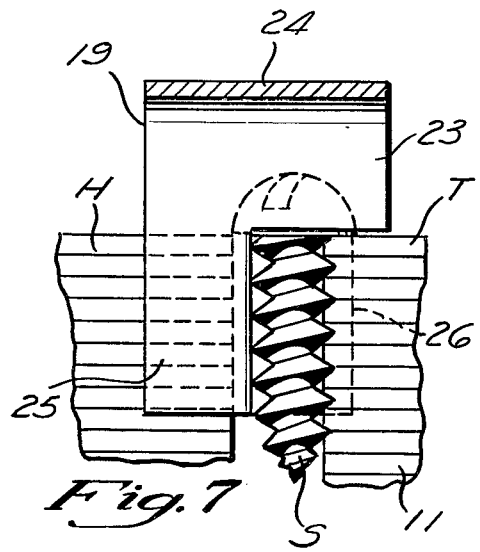
FIG. 7 is a detail elevation in enlarged scale showing the fastening of FIG. 6 in place.

Bracket 19, shown in detail in FIGS. 6 and 7, and in an assembled motor in FIGS. 1–3, is preferably formed of metal in a generally U-shaped configuration comprising legs 23 joined together by a bridge 24. Legs 23 of bracket 19 are formed (by stamping, for example) with generally cylindrical wall portions 25 comprising locating surfaces that closely fit the bore configuration at diametrically opposite heel portions H. Each leg 23 also has formed therein a wing 26 offset outwardly from cylindrical wall portions 25. Wings 26 are adapted to extend radially outwardly through the spaces between the heel portions H and toe portions T of poles P and to reach behind and engage toe portions T. Bracket 19 is secured in place by turning a self-tapping screw S into each of the spaces between the ends of toe portions T and the wings 26 as shown in FIGS. 3 and 7. Screws S are large enough with respect to the spaces that wings 26 are each urged tightly back against a heel portion H as the threads of the screws cut into the stacked laminations comprising the adjacent toe T. This is shown clearly in FIG. 7. Thus, bracket 19 is adapted to locate itself in a predetermined relationship with stator 11.

Bearing 18 is supported by bracket 19 in a central opening 27 bounded by an integrally formed short, cylindrical wall 28. Flanged bearing 18 comprises a barrel 29 and a radial flange 30. Barrel 29 fits loosely in opening 27 having an outside diameter sufficiently smaller than the inside diameter of opening 27 to permit radial adjustment of the bearing with respect to bracket 19 into a location of concentricity with the stator bore axis when bracket 19 is in its predetermined stator relationship. Flange 30 has an outside diameter larger than the diameter of opening 27 and overlies the margins of opening 27 in all possible positions of radial adjustment of bearing 18 in opening 27.

When bearing 18 is located in its desired position of radial adjustment in accordance with the method of this invention, the bearing is fastened to bracket 19 by suitable means. As shown in the drawings and especially in FIG. 4, an adhesive bonding material A placed in the gap between bearing barrel 29 and bracket cylindrical wall 28 fixes the radial position of the bearing in its bracket opening and holds and fastens it to the bracket. Bearing flange 30 axially locates the bearing against the margins of the bracket opening. Bearing 18 also, for example, may be fastened in its desired location to bracket 19 by mechanical means which clamp flange 30 to the bracket or by tack welding the flange to the bracket.

It will be apparent in connection with the explanation below of the assembly method of this invention that rotor supporting assembly 16 of FIGS. 1–4, 6 and 7 and described above is especially adapted to practice the method.

Bracket 22 of lower rotor supporting assembly 17, shown in FIGS. 1 and 2, has a generally cup shaped configuration comprising a bowl 31 and four axial extensions 32. Bracket 22 is adapted to fit over one end of stator 11 with an internal shoulder 33 in bowl portion 31 locating bracket 22 against the end of stator 11 and the inwardly facing surfaces 34 of extensions 32 having a close supporting and locating fit with the outside of stator 11. Bracket 22 is preferably molded of plastic material and may be held in its predetermined relationship with stator 11 by a bonding adhesive placed between the inwardly facing locating surfaces 34 of axial extensions 32 and the outside of stator 11. Bracket 22 also may be fastened to the stator by other suitable means such as mechanical devices including band type clamps.

Bearing 21 is supported in bracket 22 in a central opening 35 defined by an integrally molded bushing 36. Bearing 21, like flanged bearing 18, has a barrel 37 and a radially extending flange 38. See FIG. 5. Opening 35 in bushing 36 of the bracket has a larger inside diameter than the outside diameter of barrel 37 of bearing 21 to permit adjustment of the bearing in a radial direction within the opening. The permitted adjustment must allow bearing 21 to achieve a location of concentricity with the stator bore axis when bracket 22 is in its predetermined stator relationship. Flange 38 has a greater outside diameter than opening 35 so the flange overlies the end of bushing 36 in all possible positions of radial adjustment of the bearing.

The location of bearing 21 in bracket 22 is established in accordance with the method of this invention described below. Next the bearing is fastened to the bracket while in its desired location by suitable means. In FIG. 5, bearing 21 is shown fastened to the bracket by adhesive bonding material A. Note in FIG. 5, as in FIG. 4 in the case of bearing 18, the oversize relationship of the bracket opening to the bearing's barrel portion and the non-uniform spacing between them. Adhesive bonding material A conveniently accommodates whatever space results from the desired location of the bearing and effectively fastens the bearing to the bracket. Flange 38 axially locates the bearing against the end of bushing 36 of bracket 22. Other suitable means, mechanical or otherwise, may be used to fasten bearing 21 to its bracket without departing from the invention.

Also like bracket 19, bracket 22 is especially adapted to practice the assembly method of this invention described and explained in detail below.

Steps in the method of this invention for assembling a dynamoelectric machine such as descibed above comprise:

1. positioning and fixing the brackets of the rotor supporting assemblies involved in their predetermined stator relationship with respect to means for relating the locating surfaces of the brackets and the axis of the stator bore as established by bearing locator means concentric with the location of the bore axis, 2. positioning a rotor shaft bearing in the central opening of each bracket, and 3. positioning a rotor shaft bearing on each bearing locator means, and 4. fastening and attaching each bearing to its associated bracket in its relationship thereto established by the bearing locator means.

As explained below, the invention contemplates and comprehends that the order of the four steps outlined above may vary with the particular bracket member being incorporated into the machine and the particular means used for relating the bracket locating surfaces and the axis of the stator bore. Complete assembly of the machine, of course, includes removal of the fixture or the shims spacing the rotor in the stator bore. The numbered steps above, however, are those which together comprise the novel method of this invention.

In the case of an internally fitting bracket such as bracket 19, the locating means of step (1) may consist of the stator and the rotor including the shaft of the machine being assembled. The rotor must be located and held by shims, for example, in the stator bore so that the rotor shaft is concentric with the bore axis. Bracket 19 is fitted with its locating surfaces comprising cylindrical walls 25 and wings 26 in close supporting engagement with the stator bore and pole pieces; i.e., in its predetermined stator relationship, as in FIGS. 1–3.

Figure 12:
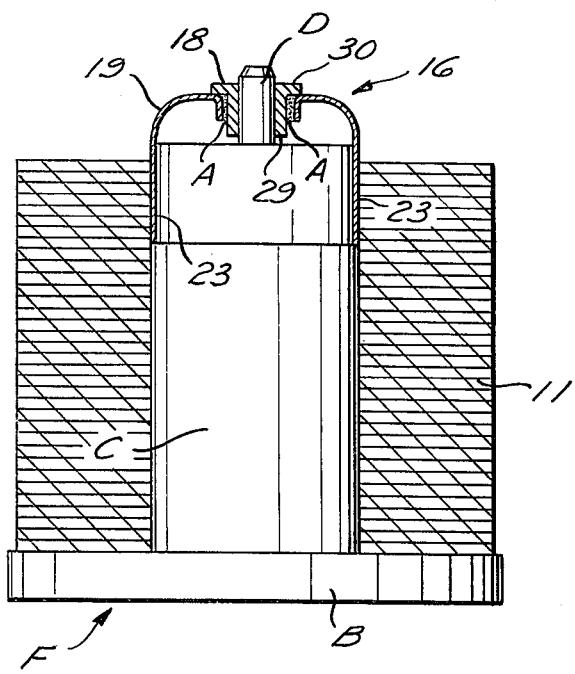
FIGS. 12 and 13 are elevation views of fixtures used in practicing the method of this invention and including upper and lower rotor supporting brackets and associated rotor bearings, respectively, in section.

Alternatively, the locating means of step (1) for an internally fitting bracket such as 19 may be a fixture such as is indicated at F in FIG. 12. Fixture F comprises a base B and cylindrical plug C adapted to closely fit the bore of stator 11 and having a bearing locator dowel D extending from its upper end. Dowel D is substantially the same diameter as rotor shaft 15 and located concentrically of the bore plug C of the fixture. When using fixture F to practice step (1) of the assembly method, stator 11 is dropped over plug C and onto base B. Bracket 19 is placed in its predetermined stator relationship with dowel D projecting through central opening 27. The diameter of the upper end of plug C preferably is reduced to insure its freedom from interference with the legs 23 of bracket 19 and modified forms of brackets disclosed below and with their installation, whatever its nature.

After each bracket 19 has been located in either of the alternate ways above and fixed to stator 11 in its predetermined stator relationship, bearing 18 is placed on the bearing locator means (either rotor shaft 15 or dowel D) and in the bracket's central opening 27 and thereby concentric with the location of the bore axis. The bearing as thus located is then attached to the bracket in any suitable manner. If adhesive bonding material is used, it is preferably applied in its plastic state to the outside of barrel 29 and the underside of flange 30 of the bearing before putting the bearing over the bearing locator means and in the central bracket opening. The plastic material will permit the bearing to move radially in the central opening to its desired position of concentricity. Of course the bonding material must be hardened before the fixture is removed from the bearing or the shims are removed from between the stator bore and the rotor.

It will be obvious that the same result is achieved if some of the steps above are performed in a different sequence than listed. For example, those steps prior to the attachment of the bearings to the brackets may be accomplished by mounting the bearings in the oversize central openings of the brackets or on the bearing locator means (shaft or dowel) prior to positioning of the brackets in their predetermined stator relationship. Since the advantages and benefits of the invention are achieved in any event, the invention clearly comprehends the different sequences of the prescribed steps.

Figure 13:
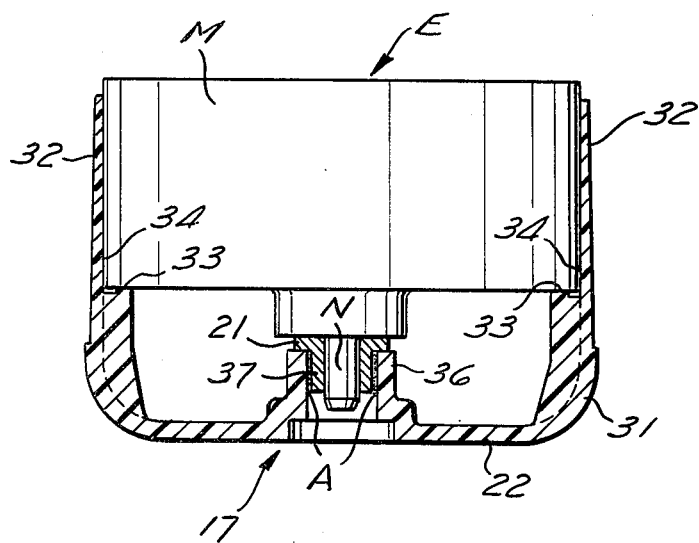

In the case of an externally fitting bracket such as 22, the locating means of step (1) may comprise either a stator with shimmed rotor or a fixture E such as indicated generally in FIG. 13. Fixture E comprises a plug M and a central shouldered dowel N. Plug M simulates stator 11 and particularly the outer surface thereof and fits within axial extensions 32 of bracket 22 and against internal shoulder 33 of bowl 31. Dowel N is concentric with plug M.

When performing the four steps in the method of assembly using an externally fitting bracket such as bracket 22, bearing 21 is preferably placed in bushing 36 first, bedded in an adhesive bonding material in a plastic state. Bracket 22 is then placed over either the end of stator 11 and rotor shaft 15 of rotor 14 spaced by shims in stator bore 20, or fixture E and located in its predetermined stator relationship. When the bonding material has set sufficiently to insure that the bearing position in the bracket will not change, the fixture or the shims may be removed, as the case may be.

The motor shown in this disclosure has both an internally fitting and an externally fitting rotor supporting bracket. Obviously, a dynamoelectric machine having only one or the other or both types of rotor supporting assembly could be assembled in a manner comprehended by this invention.

In the foregoing description and in the claims, the predetermined stator relationship of the brackets 19 and 22 referred to comprehends a relationship as provided by a close supporting fit between the brackets and a stator. The relationship is predetermined in the sense that a bracket carrying a bearing positioned and fastened to it while in such a relationship can be moved from fixture to stator or from stator to stator and the concentricity of the bearing it carries will remain true to the extent originally provided.

Other modified forms of brackets for rotor supporting assemblies are shown in FIGS. 8–9 and 10–11. Like the bracket 19, for example, these modified form brackets are especially adapted for the practice of the assembly method of this invention.

Figure 9:
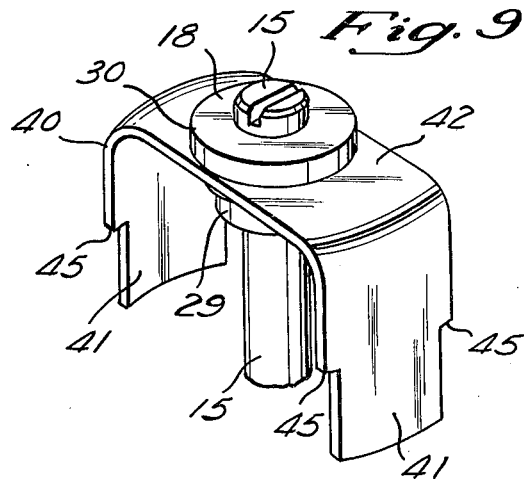
FIG. 9 is another perspective view of the bracket of FIG. 8 supporting a rotor bearing and shaft.

As shown in FIGS. 8 and 9, bracket 40 comprises a pair of legs 41 joined together by a bridge 42 having a central opening 43 defined by an integrally formed cylindrical wall 44. Opening 43 is larger than the bearing it is intended to support to permit radial adjustment of the bearing. Legs 41 have a generally curved form that conforms to bore 20 of stator 11 in the region of heels H of pole pieces P. The legs also have offsets 45 in their sides for engagement with the end of toe T of each pole piece P when the free end of the leg is in close supporting engagement with and against bore forming side of heel H. It will be apparent that bracket 40 has a predetermined stator relationship as comprehended by this invention permitting a bearing to be located within the oversize opening 43 concentric with the stator bore axis by use of either a rotor concentrically located and shimmed in the bore of the stator or by use of a fixture such as fixture F of FIG. 12.

Flanged bearing 18 adapted to receive shaft 15 and having a barrel 29 and radial flange 30 is carried in central opening 43 and located and fastened to bracket 40 in the same manner as to bracket 19.

Bracket 40 is preferably fastened in place in stator bore 20 by means of adhesive bonding material placed between the outer locating surfaces of legs 41 and stator bore 20.

Figure 10:
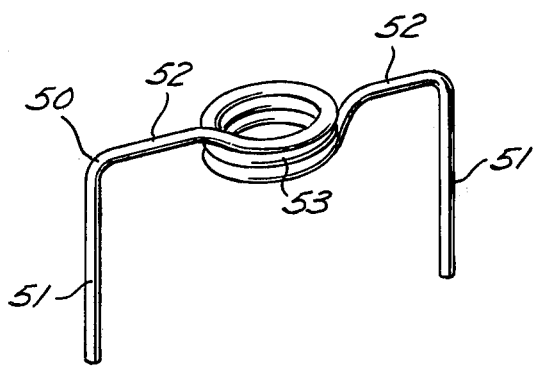
FIG. 10 is a perspective view in enlarged scale of another modified form of rotor supporting bracket.
Figure 11:
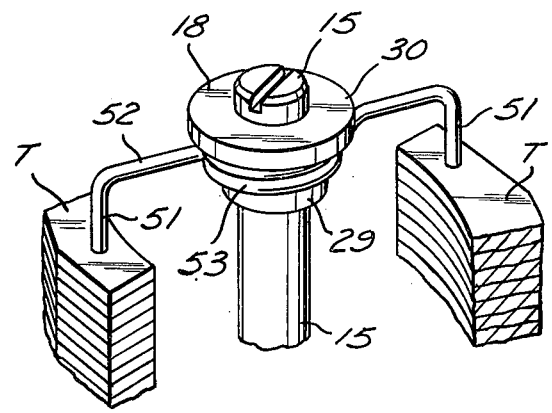
FIG. 11 is a perspective view of the bracket of FIG. 10 supporting a rotor bearing and shaft.

The modified form of bracket 50 shown in FIGS. 10 and 11 comprises a heavy wire formed to provide two legs 51 joined by a bridge 52. Centrally of bridge 52, repeated turns form a coil 53 adapted to receive the barrel 29 of bearing 18. Flange 30 of the bearing overlies the end of coil 53. Coil 53 is larger than barrel 29 of the bearing in order to permit radial adjustment of the bearing. Adhesive bonding material preferably is used to fasten the bearing to bracket 50, though other means may be employed. Bracket 50 is located with respect to stator 11 by inserting the ends of legs 51 into holes provided in the heels H or toes T of the pole pieces P.

It will be obvious to those skilled in the art that the assembly method of this invention can be practiced in connection with other forms of dynamoelectric machines than the representive machine illustrated herein. Such machines may have a different number of poles and/or a uniform air gap. The method is applicable, however, to all machines having a stator able to accommodate a rotor supporting assembly bracket in a predetermined, close, supporting relationship.

It is to be understood that various modifications of the method and apparatus disclosed herein may be made by those skilled in the art without actually departing from the spirit and scope of the invention.

We claim:

1. In a method of assembling a dynomoelectric machine including
    a stator having an axial bore,
    a rotor having a shaft,
    a rotor shaft bearing,
    a bracket having a central opening for receiving said rotor shaft bearing with radially adjustable clearance and having at least two stator locating surfaces for engaging said stator and locating and supporting said bracket in a fixed predetermined positional relationship with respect to said stator and bridging said stator bore with said bore axis extended passing through said opening, the steps comprising 1. positioning and securing said bracket in said predetermined positional relationship with respect to a fixture having surfaces corresponding to surfaces on said stator related to locating surfaces of said bracket and a bearing locator pin corresponding to said rotor shaft mounted in fixed position on said fixture coaxial with the corresponding location of said bore axis, and
2. positioning said shaft bearing on said bearing locator pin, and
3. positioning said shaft bearing in said bracket opening,
4. securing said bearing to said bracket in its relationship thereto established by said fixture, the first three steps being performed in any appropriate sequence following by step (4).

2. The method according to claim 1 in which said fixture and the locating surfaces of said bracket engage surfaces in the bore of said stator.

3. The method according to claim 1 in which the locating surfaces of said bracket engage surfaces of said fixture corresponding to surfaces outside the bore of said stator.

4. The method according to claim 1 in which step (4) comprises securing said bearing to said bracket with adhesive bonding material.

5. The method according to claim 1 in which step (1) comprises securing said bracket directly to said stator by mechanical means.

6. In a method of assembling a dynomoelectric machine having a stator with an axial bore, a rotor with a shaft adapted to rotate with a small air gap, clearance in the stator bore, a rotor shaft bearing, and a bracket having a central opening for receiving a rotor shaft bearing with radially adjustable clearance and having at least two stator locating surfaces for engaging said stator and locating said bracket in a fixed predetermined positional relationship with respect to said stator and bridging said stator bore with said bore axis extended passing through said opening, the steps comprising
1. positioning said bracket in said predetermined positional relationship with respect to a fixture for relating said locating surfaces of said bracket and the axis of said bore, said fixture having surfaces corresponding to surfaces on said stator for mating with said locating surfaces of said bracket and having a locator pin corresponding to said rotor shaft mounted on said fixture concentric with the corresponding location of the axis of said bore,
2. placing said shaft bearing in said bracket opening,
3. placing said shaft bearing on said locator pin of said fixture,
4. securing said shaft bearing to said bracket in said bracket opening in the relationship established by the fixture in the previous steps,
5. removing said bracket and bearing secured thereto from the fixture and positioning said bracket on said stator in said predetermined positional relationship by means of said locating surfaces,
6. securing said bracket to said stator in the positional relationship established in step (5), steps (1), (2) and (3) being performed in any sequence and followed by the other steps.

7. In a method of assembling a dynamoelectric machine having a stator with an axial bore, a rotor with a shaft adapted to rotate with a small air gap clearance in the stator bore, a rotor shaft bearing, and a bracket having a central opening for receiving a rotor shaft bearing with radially adjustable clearance and having at least two stator locating surfaces for engaging said stator and locating said bracket in a predetermined fixed position with respect to said stator and bridging said stator bore with said bore axis extended passing through said opening, the steps comprising
1. positioning a fitted plug fixture in the bore of said stator, said fixture having a bearing locator pin in concentric relationship with said bore and corresponding to the portion of the rotor shaft extending outwardly beyond the end of the rotor,
2. mounting said bracket on said stator with said two locating surfaces engaging the bore of said stator and locating said bracket in a predetermined fixed position bridging said bore with the bearing locator pin of the fixture exture extending through said opening in said bracket,
3. placing said shaft bearing on, the bearing pin locator
4. placing said shaft bearing in said bracket opening,
5. securing said shaft bearing to said bracket in said bracket opening in the relationship established in the steps above, and
6. removing the fitted plug fixture of step (1) from the air gap, steps (2) (3) and (4) being performed in any appropriate sequence following step (1) and before steps (5) and (6).

* * * * *